Patented Apr. 22, 1941

2,239,555

UNITED STATES PATENT OFFICE 2,239,555

STABLE ROSIN ACID, ROSIN ESTER, AND ROSIN PRODUCT CONTAINING THEM AND A METHOD FOR THEIR PRODUCTION

Elmer E. Fleck, Silver Spring, Md., and Samuel Palkin, Washington, D. C.; dedicated to the free use of the People of the United States of America No Drawing. Application March 19, 1938, Serial No. 196,956

9 Claims. (Cl. 260—97)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

We hereby dedicate the invention herein described to the free use of the People of the United States of America to take effect on the granting of a patent to us.

This invention relates to new compositions of matter comprising stabilized rosin, stabilized acids from rosin and stabilized esters of said acids. This invention also embraces a process for producing these products.

One of the objects of this invention is to produce a stabilized rosin containing substantially the same proportions of resenes and other neutral materials as normal rosin.

Another object of this invention is to produce rosin products, including acids from rosin and esters of said acids, having a high concentration of pyroabietic acid substantially free from acids less stable than pyroabietic acid and substantially free from resenes and other neutral materials.

This invention, however, is not limited to rosin but is generally applicable to pine oleoresin and its derivatives. For the purpose of this application, it is to be understood that derivatives of pine oleoresin include rosin, resin acids, rosin acids, fractions of pine oleoresin, both liquids and solids, such as those embraced in United States Letters Patent 2,086,777. The acids of these derivatives include such acids as sapinic acids, pimaric acids, abietic acids, and sylvic acids.

The esters refer to such products which can be obtained from any known esterified pine oleoresin or esterified rosin, ester gum, esterified resin acids, esterified rosin acids, and ester gum products such as those obtained from the solid and liquid fractions embraced within said United States Letters Patent 2,086,777.

We have found that a stable rosin product may be obtained by heating pine oleoresin or one of its derivatives in the presence of a catalyst, such as palladium carbon, platinum carbon, nickel carbon, fuller's earth, and commercially prepared activated carbons, for a sufficient length of time to produce the desired reaction after which the catalyst is removed. By utilizing this same process, acids from pine oleoresin or its derivatives and esters of the acids from pine oleoresin or its derivatives may be stabilized.

The heating is generally effected between a temperature of 200° C. to 300° C., from 15 minutes to 5 hours, depending upon the initial material used, as well as the catalyst. Examples will be given hereinafter to clarify the procedure.

After reaction has taken place, the catalyst may be removed by several methods. It may be filtered from the reaction product in its molten state, or the reaction product may be dissolved in a solvent and the catalyst then removed by filtering, after which the solvent is removed from the reaction product. Such solvents as turpentine, alcohol, ether, and so forth, may be used.

It may be found desirable in some instances to heat the initial material in the presence of the chosen catalyst above atmospheric pressure.

This invention may be carried into practice by the utilization of the procedures above described and the following examples are given for illustrative purposes and for a better understanding of the invention by those skilled in the art.

The optical characteristics are used as a quantitative measure of the amount of pyroabietic acid formed during the catalytic process. The reason this optical measure may be employed is that the known resin and rosin acids, with the exception of d-pimaric acid, all rotate polarized light to the left, and, inasmuch as d-pimaric acid is virtually not affected by the catalysts, the shift of the rotation of polarized light to the right may be taken as a quantitative and rapid method of determining the quantity of pyroabietic acid in a given sample.

*Example No. 1.*—Fifty grams of gum rosin (WW grade)

$$[\alpha]_D^{20} + 14°$$

and 1 g. of palladium carbon as the catalyst were heated at 240° C.–245° C. for 2½ hours. The reaction means was diluted with 100 cc. of turpentine and the catalyst removed by filtration. The turpentine was removed by steam distillation. The resulting rosin showed $$[\alpha]_D^{20} + 44°$$

in absolute alcohol.

*Example No. 2.*—Fifty grams of l-abietic acid, $$[\alpha]_D^{20} - 81°$$

and 1 g. palladium-carbon as the catalyst were heated at 215° C.–220° C. for 1½ hours. The reaction mass was stirred mechanically. The product was cooled until 200 cc. of alcohol could be added. The catalyst was removed from the hot alcoholic solution by filtration. The hot filtrate was diluted with water to the point of crystallization. The cooled mass was filtered and washed with 100 cc. of 50 percent alcohol. When dried at 80° C. in vacuum, 46 g. of a white crystalline product was obtained which melted at 169° C.–170° C. and showed $$[alpha]_D^{20} + 62°$$

Analysis showed the product to conform to the formula $C_{20}H_{30}O_2$.

*Example No. 3.*—Five grams of ethyl abietate, $$[alpha]_D^{20} - 22°$$

and 0.5 g. of palladium carbon as the catalyst were heated at 240° C.–245° C. for one hour. The catalyst was removed by filtration. The ethyl abietate showed an optical activity of $$[alpha]_D^{20} + 43°$$

in absolute alcohol.

*Example No. 4.*—Two grams of wood rosin and 1 g. of activated carbon were heated at 240° C.–245° C. for five hours. The cooled mass was extracted with ether. The acid portion was extracted from the filtered ether solution with N/4 NaOH. The pyroabietic acid was freed from solution by addition of dilute HCl. The dried acid showed $$[alpha]_D^{20} + 37°$$

*Example No. 5.*—Thirty-five grams of rosin (containing 12–14% resenes) and 1 g. of palladium carbon as the catalyst were heated at 240° C.–245° C. for five hours. The reaction mass was diluted with ether and the catalyst was removed by filtration. When the ether was distilled from the filtrate the resulting rosin showed an $$[alpha]_D^{20} + 40°$$

This product still contained the original amount of resenes.

The following tables show the variation effected by the use of various catalysts under identical conditions.

Table 1 relates to the catalytic treatment of l-abietic acid showing the catalyst utilized in each case, the percentage of yield, and the optical characteristics of the acid.

Table 2 shows the result of the treatment of American rosin with various metallic and non-metallic catalysts.

Table 3, however, shows the effect of the catalytic treatment of rosins from different sources, all tests being made under the identical conditions indicated.

TABLE 1

*Catalytic treatment of l-abietic acid*

| Catalyst | Yield of acid, Percent | [Alpha]$_D^{20}$ of acid, Degrees |
|---|---|---|
| Pd-carbon (0.5 g. catalyst used) | 85 | +53 |
| Carbex | 70 | +53 |
| Carboraffin | 65 | +53 |
| Sumacarb | 65 | +53 |
| Fisher's activated charcoal | 50 | +45 |
| Pt carbon (0.5 g. catalyst used) | 65 | +44 |
| Fuller's earth (at 200° C.) | 35 | +42 |
| Fisher's absorbing charcoal | 55 | +23 |
| Darco | 80 | +19 |
| Ni carbon (0.5 g. catalyst used) | 55 | +13 |
| Norite | 75 | +3 |
| Heat (without catalyst) | 80 | −28 |

TABLE 2

*Catalytic treatment of American rosin with metallic and non-metallic catalysts*

| Catalyst | Yield of acid, Percent | [Alpha]$_D^{20}$ of acid, Degrees |
|---|---|---|
| Pd carbon | 70 | +56 |
| Pt carbon |  | +38 |
| Fisher carbon |  | +36 |
| Carbex | 60 | +36 |
| Ni carbon | 77 | +37 |
| Fisher carbon | 70 | +29 |
| Silica gel | 65 | +22 |
| Fisher carbon | 38 | +18 |
| Raney nickel |  | +16 |
| Heat alone [1] |  | +2 |
|  |  | +1 |

[1] This sample was heated without a catalyst for purposes of comparison.

TABLE 3

*Catalytic treatment of rosins from different sources. Conditions: Rosin, 2 g.; Pd-carbon catalyst, 0.5 g.; heated 5 hrs. at 250° C.*

| Rosin | [Alpha]$_D^{20}$ of rosin, Degrees | Acids Yield, Percent | Acids [Alpha]$_D^{20}$, Degrees |
|---|---|---|---|
| P. pinaster (French) | −5 | 70 | +54 |
| P. pinaster (bleached French) | −11 | 75 | +53 |
| P. pinaster (Portuguese) | +13 | 70 | +51 |
| P. longifolia (Indian) | +2 | 70 | +51 |
| P. palustris and P. caribaea (American wood) | −18 | 70 | +52 |
| P. palustris and P. caribaea (American wood) | +2 | 70 | +53 |
| P. palustris (American) | −4 | 75 | +55 |
| P. caribaea (American) | +16 | 70 | +55 |
| P. caribaea (American) (no catalyst—heat alone) | +16 |  | +1 |

An example is given in each of the above tables of a particular sample heated without any catalyst for the purpose of comparison.

The products produced by the above process have great stability and high melting points and obviate the objectionable characteristics of ordinary rosin. Rosin is a product of great commercial importance, finding extensive use in the manufacture of varnishes, soaps, paper size, ester gum, synthetic resins, and so forth. Ordinary rosins when used in connection with these products have some objectionable qualities due to the fact that they are unstable when exposed to oxidation by air or other agents. By utilizing the process above described, the rosin is rendered practically stable and capable of being utilized with greater success in the above-mentioned industrial products.

There are other known methods by which rosin may be stabilized but none of these methods are as simple or as efficient as that disclosed in this specification. For example, one of the principal methods of producing stable products from rosin or rosin acids is hydrogenation. Also stable products may be extracted from rosin if the rosin is subject to a prolonged heat treatment of about 100 hours at high temperature. The rosin acids by this treatment undergo in part a conversion to a more stable type of acids known as pyroabietic acids, but this takes place only to a relatively small extent and the rosin undergoes pyrolytic decomposition to an appreciable extent. Therefore, to obtain the desired portion, the complex product resulting from such heat treatment must be subjected to expensive refining, including distillation at reduced pressure, or systematic fractional crystallization from various solvents. Both distillation and crystallization are often resorted to in addition to other expensive treatments.

The present invention is particularly useful in that it embraces a product and a process for producing the same which is of itself sufficiently rich in pyroabietic acid and sufficiently free from undesirable products, so that it can be used directly in making such industrial products as varnishes, soaps, ester gums, synthetic resins, and so forth, without resorting to elaborate methods of refining as above mentioned.

The products resulting from the use of the process of the present invention contain a sufficiently high concentration of pyroabietic acid to be useful as crude or technical pyroabietic acid. Higher purity, of course, can be obtained by distillations and/or crystallizations but a smaller number of such distillations and/or crystallizations is necessary than with other processes heretofore known.

We have also found that the action of the catalysts in our process is quite specific in that the conversion product is dextro-rotating, corresponding to the so-called "alpha-pyroabietic" acid, regardless of the source of resin or rosin acids, as distinguished from the levo-rotating or beta form of pyroabietic acid.

The use of carbon as a catalyst or catalyst carrier has the effect of a decolorizing and clarifying action, which further enhances the product produced.

As an example of the stability of the products obtained by these processes, various tests have been conducted. In one of these tests, 1-abietic acid was exposed to air at room temperature for three months. The melting point changed from 166° C.–169° C. to 115° C.–125° C., indicating that a decomposition had taken place. On the other hand, when pyroabietic acid as obtained by our process was exposed for the same length of time under the same environmental conditions no lowering of the melting point could be observed.

Having thus described our invention, we claim:

1. The process for stabilizing rosin which process comprises heating the rosin in the presence of an activated carbon catalyst at a temperature of about 200° C. to 300° C. until the rosin is stabilized, thence removing the catalyst and recovering the stabilized rosin.

2. The process for stabilizing rosin which process comprises heating the rosin at a temperature of about 200° C. to 300° C. in the absence of hydrogen and in the presence of a catalyst chosen from the group consisting of palladium carbon, platinum carbon, nickel carbon, and activated carbons until the rosin is stabilized, thence removing the catalyst and recovering the stabilized rosin.

3. The process for stabilizing rosin which process comprises heating the rosin in the presence of an activated carbon catalyst at a temperature of about 200° C. to 300° C. until the rosin is stabilized, dissolving the reaction product in a solvent, thence filtering the solution to remove the catalyst, and thence removing the solvent and recovering the stabilized rosin.

4. The process for stabilizing rosin esters which process comprises heating a rosin ester at a temperature of about 200° C. to 300° C. in the absence of hydrogen and in the presence of a catalyst chosen from the group consisting of palladium carbon, platinum carbon, nickel carbon, and activated carbons, until the rosin ester is stabilized, thence removing the catalyst and recovering the stabilized rosin ester.

5. The process for stabilizing rosin which process comprises heating the rosin at a temperature of about 200° C. to 300° C. for 15 minutes to 5 hours in the absence of hydrogen and in the presence of a catalyst chosen from the group consisting of palladium carbon, platinum carbon, nickel carbon, and activated carbons, thence removing the catalyst and recovering the stabilized rosin.

6. The process for stabilizing rosin which process comprises heating the rosin at a temperature of about 200° C. to 300° C. in the presence of an activated carbon catalyst until the rosin is stabilized, thence filtering the reaction product in its molten state to remove the catalyst, and recovering the stabilized rosin.

7. The process for stabilizing rosin acids which process comprises heating the acids at a temperature of about 200° C. to 300° C. in the presence of an activated carbon catalyst until the acids become stabilized, thence removing the catalyst and recovering the stabilized acids.

8. The process of stabilizing a rosin ester which process comprises heating the ester at a temperature of about 200° C. to 300° C. in the presence of an activated carbon catalyst until the ester is stabilized, thence removing the catalyst and recovering the stabilized ester.

9. The process for stabilizing rosin which process comprises heating the rosin at a temperature of about 200° C. to 300° C. above atmospheric pressure in the presence of an activated carbon catalyst until the rosin is stabilized, and thence removing the catalyst and recovering the stabilized rosin.

ELMER E. FLECK.
SAMUEL PALKIN.